United States Patent
DeJarnett

(10) Patent No.: US 12,192,244 B2
(45) Date of Patent: Jan. 7, 2025

(54) RESOURCE ACCESS MANAGEMENT BASED ON CONFIDENCE LEVEL IN DEVICE POSTURE

(71) Applicant: Omnissa, LLC, Mountain Vew, CA (US)

(72) Inventor: Steve DeJarnett, San Jose, CA (US)

(73) Assignee: Omnissa, LLC, Mountain View, CA (US)

( * ) Notice: Subject to any disclaimer, the term of this patent is extended or adjusted under 35 U.S.C. 154(b) by 163 days.

(21) Appl. No.: 18/050,774

(22) Filed: Oct. 28, 2022

(65) Prior Publication Data

US 2024/0146768 A1 May 2, 2024

(51) Int. Cl.
*H04L 9/40* (2022.01)

(52) U.S. Cl.
CPC ............ *H04L 63/20* (2013.01); *H04L 63/102* (2013.01); *H04L 63/105* (2013.01)

(58) Field of Classification Search
None
See application file for complete search history.

(56) References Cited

U.S. PATENT DOCUMENTS

| | | | | |
|---|---|---|---|---|
| 7,591,017 B2* | 9/2009 | Watkins | ................ | G06F 21/577 726/27 |
| 8,719,950 B2* | 5/2014 | Ikeda | .................... | G06F 21/604 726/27 |
| 8,756,651 B2* | 6/2014 | Baer | ....................... | H04L 63/08 713/168 |
| 8,819,769 B1* | 8/2014 | van Dijk | ............... | H04L 67/303 726/1 |
| 8,856,865 B1* | 10/2014 | Martini | ................... | H04W 4/08 726/1 |
| 9,137,265 B2* | 9/2015 | Chari | ....................... | H04L 63/20 |
| 9,251,792 B2* | 2/2016 | Scheffer | ............ | G06F 16/24578 |
| 9,420,002 B1* | 8/2016 | McGovern | .............. | H04L 63/20 |
| 9,519,799 B2* | 12/2016 | Asim | ................... | G06F 21/6245 |
| 9,848,005 B2* | 12/2017 | Ardeli | ................... | H04L 63/101 |
| 10,057,239 B2* | 8/2018 | Chickering | ........... | H04L 67/146 |
| 10,142,371 B2* | 11/2018 | Sastry | .................. | H04L 63/102 |
| 10,284,595 B2* | 5/2019 | Reddy | ................ | H04L 63/1416 |
| 10,673,863 B2* | 6/2020 | Lemay | .................. | H04L 63/105 |
| 10,673,905 B1* | 6/2020 | Chud | ....................... | H04L 63/20 |
| 10,735,401 B2* | 8/2020 | Lonas | ..................... | B66B 7/025 |
| 11,463,444 B2* | 10/2022 | Stephens | ............... | H04L 63/105 |

(Continued)

*Primary Examiner* — Backhean Tiv
(74) *Attorney, Agent, or Firm* — Kim & Stewart LLP

(57) ABSTRACT

Systems and methods are described herein for assessing the device posture of user devices requesting access to a managed resource and for determining a confidence level in the device's posture. In an example, a user device can request a managed resource. A server can receive the request and retrieve an associated access policy. The access policy can include policy attributes to use for assessing the user device's device posture. The server can calculate a device attribute score for each policy attribute. The server can also calculate a confidence score for each device attribute score that measures the confidence level in the device attribute score. Using the two scores, the server can calculate a device posture score. Access to the resource can be granted or denied based on whether the device posture score exceeds a threshold score designated in the access policy.

20 Claims, 4 Drawing Sheets

(56) References Cited

U.S. PATENT DOCUMENTS

| | | | |
|---|---|---|---|
| 11,722,530 B2* | 8/2023 | Hu | H04L 63/20 |
| | | | 726/17 |
| 11,729,220 B2* | 8/2023 | Barton | H04L 63/0815 |
| | | | 726/1 |
| 11,810,130 B2* | 11/2023 | Cervantez | G06Q 20/4016 |
| 2008/0172715 A1* | 7/2008 | Geiger | G06F 21/36 |
| | | | 726/1 |
| 2008/0288330 A1* | 11/2008 | Hildebrand | G06Q 10/06398 |
| | | | 705/7.42 |
| 2014/0343989 A1* | 11/2014 | Martini | H04L 63/104 |
| | | | 705/7.17 |
| 2015/0281277 A1* | 10/2015 | May | H04L 63/10 |
| | | | 726/1 |
| 2016/0105441 A1* | 4/2016 | Banerjee | H04L 63/102 |
| | | | 726/1 |
| 2017/0118651 A1* | 4/2017 | Iozzo | H04W 4/025 |
| 2024/0146768 A1* | 5/2024 | DeJarnett | H04L 63/105 |

* cited by examiner

RESOURCE ACCESS MANAGEMENT BASED ON CONFIDENCE LEVEL IN DEVICE POSTURE

BACKGROUND

Most businesses and organizations today use telecommunication technology in some way to operate. To protect resources of the organization, some organizations, such as enterprise organizations, manage access to resources using a device management system, such as a Unified Endpoint Management ("UEM") system. UEM systems often require that a user device be enrolled in the UEM system before granting access to internal resources. Enrolling a user device can allow an enterprise to manage and enforce security policies at user devices.

Even when a user device is enrolled in the UEM systems, additional steps are often taken to secure resources of the organization. For example, access policies are often used that designate conditions that must be met before accessing a corresponding resource. For example, an access policy can require that the user device requesting the resource be enrolled in the UEM system, have updated virus and malware definitions installed, have a certain type of device authentication enabled, and so on. If the conditions are met, then the device posture is considered secure enough to allow the user device to access the resource.

One problem with these methods is that they do not consider the reliability of the information provided by the user device regarding the access conditions. For example, if a user device reports that its antivirus definitions are up to date, but the last update was six months ago and most other enrolled user devices have definitions updated in the last week, then the requesting user device's definitions are likely not up to date as reported. In another example, an access policy can require a UEM-issued security certificate. If the user device provides a security certificate issued two years ago and most enrolled devices received a new security certificate in the last year, then this could indicate that the user device does not actually meet the proper security protocols for accessing the resource.

As a result, a need exists for assessing a confidence level in device posture information.

SUMMARY

Examples described herein include systems and methods for determining confidence in device posture. As used herein, the term "device posture" can be used to encompass various device attributes or statuses, either individually or collectively, and is not intended to be limiting in any way. In an example, a user device can request access to a resource managed by a UEM system or other access management system. The request can be received by a management server that assesses the user device's posture according to an access policy for the requested resource. The access policy can include policy attributes, which can be attributes of the requesting user device that should be assessed for determining the user device's posture.

The management server can retrieve data related to the policy attributes identified in the access policy. For example, if the access policy requires a minimum operating system ("OS") version, then the management server can retrieve the user device's OS version from the user device. If the access policy requires that the user device have a lock screen enabled that requires a credential to unlock, then the management server can retrieve related information from the user device. Some data can be retrieved from historical data saved in the UEM system.

The management server can calculate a device attribute score for each device attribute. Some device attributes scores can be binary. For example, the user device can receive a one for policy attributes that it has and a zero for those it does not. Some device attributes can be based on a scale, such as zero to one in decimal increments, or zero to ten.

The management server can then assess the confidence of the device attribute scores. The management server can do this, for example, by calculating a confidence score for each device attribute score. The confidence score can indicate a confidence level in the accuracy and validity of a user device's policy attribute data. Various factors can contribute to a confidence score, and the factors used can depend on the associated policy attribute. One factor can include the age of the attribute data because older data can be out of date and therefore less reliable. Some factors can be based on a comparison of the requesting user device and other enrolled user devices in the UEM system. For example, if the user device's antivirus and antimalware definitions were last updated two months ago, but most other enrolled user devices updated the definitions in the last two weeks, then this can lower the UEM system's confidence in the corresponding policy attribute of the user device.

Another factor can include any indication of malicious code or activity at the user device, which can reduce the confidence in any data received from the user device. Another factor can be based on user behavior. For example, the management application can collect data on typing patterns of the user, applications typically accessed by the user, authentication failure rates, and other user similar behaviors. Recent user behavior can be compared to more historical user behavior to identify any anomalies or changes in behavior, which can lower the confidence score. As an example, a sudden drop or rise in typing speed, a sudden change in application use, or a sudden change in authentication failure rate can indicate that the user device has been accessed by an authorized user. Other factors can be based on the user device's network connection, issues that occurred with back-end services, and so on.

The management server can calculate a confidence score for each device attribute score. The management server can then calculate a device posture score that combines the device attribute and confidence scores. In one example, the confidence score can be a multiplier for the device attribute score based on the confidence level. For example, if the management server determines that it is 60% confident in the data related to a policy attribute, then it can multiply the corresponding device attribute score by 0.6.

The management server can calculate a device posture score for each policy attribute, an overall device posture score for the user device, or some combination of these, depending on the access policy. The management server can then compare the device posture scores to scoring thresholds designated in the access policy. If the device posture scores satisfy the scoring thresholds, then the user device can be granted access to the requested resource.

If one or more device posture scores do not satisfy the scoring thresholds, then the management application can take various actions, depending on the access policy. In one example, the management application can simply deny access to the resource. In another example, the management application can provide options for mitigating a low posture score, such as by sending a one-time password ("OTP") to another device enrolled with the user's profile to confirm that the user requesting access is the entitled user, prompting the user to input a biometric credentials like a fingerprint or facial recognition, instructing the user to update endpoint protection software, instructing the user to establish a VPN connection that is subject to additional security scanning, and so on. In another example, the access policy can provide alternate policy attributes that can be analyzed. If the device posture score for an alternate policy attribute satisfies its scoring threshold, then this can overcome a low device posture score for another attribute. In another example, the user device can be granted limited access to the requested resource, such as being granted read-only access to an application or being restricted from accessing certain data in an application. In one example where a user is given remediation options, the user device can be granted limited access until the remediation requirements are completed.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described herein for assessing the device posture of user devices requesting access to a managed resource and for determining a confidence level in the device's posture. In an example, a user device can request access to a managed resource. A server can receive the request and retrieve an associated access policy. The access policy can designate policy attributes. Policy attributes can be attributes of the requesting user device that are used for assessing the user device's device posture according to a resource's access policy. The server can calculate a device attribute score for each policy attribute. The server can also calculate a confidence score for each device attribute score that measures the confidence level in the device attribute score. Using the two scores, the server can calculate a device posture score. Access to the resource can be granted or denied based on whether the device posture score exceeds a threshold score designated in the access policy.

Figure 1:
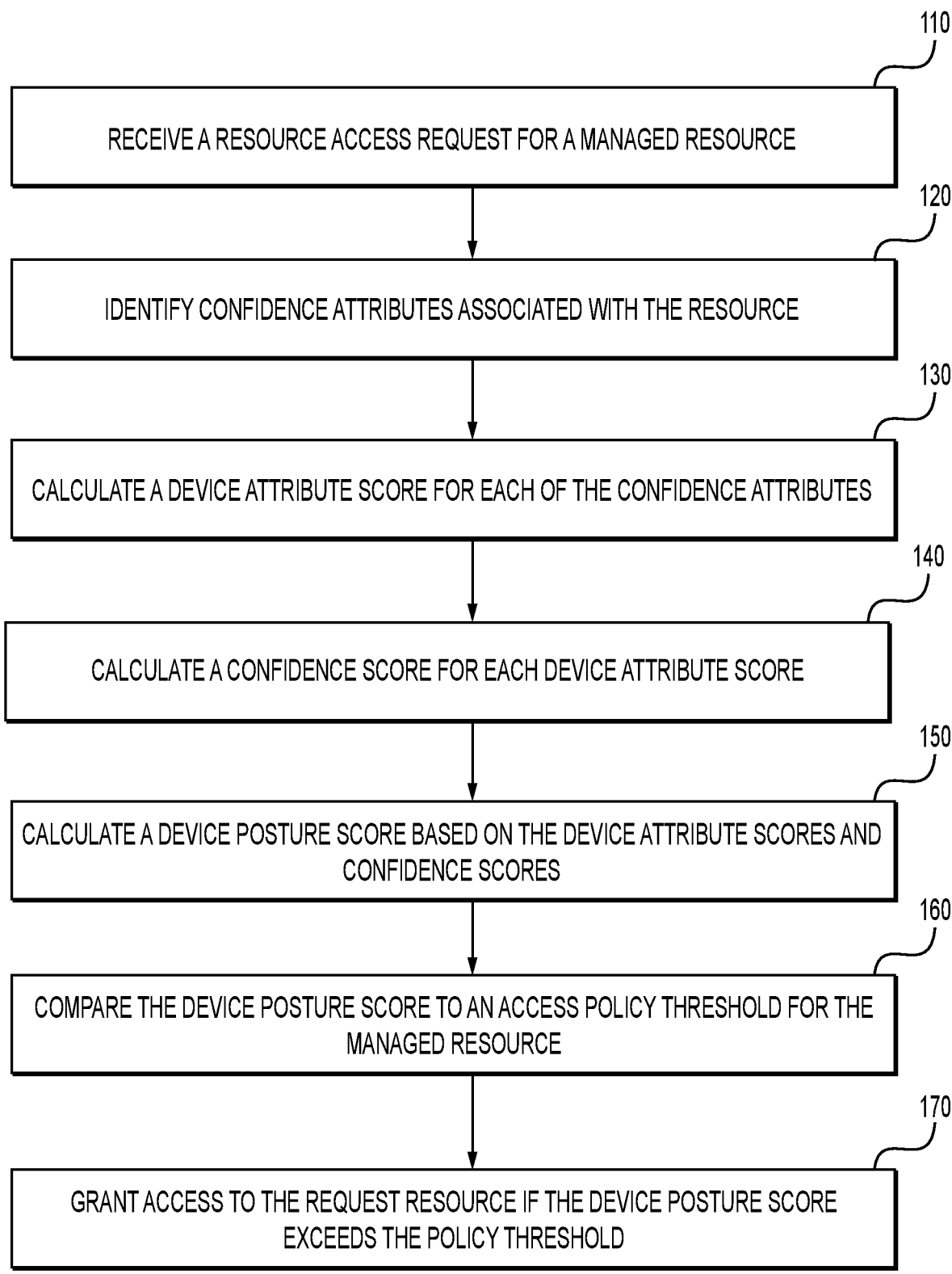
FIG. 1 is a flowchart of an example method for determining confidence in device posture.

FIG. 1 is a flowchart of an example method for determining confidence in device posture. At stage 110, a management server can receive a resource access request for a managed resource. A managed resource can include any type of data, application, or service made available by an enterprise or considered worthy of additional protection, such as a resource considered confidential in some respect. For example, access to a managed resource can be managed by a UEM system. A UEM system can be any system that allows an enterprise to manage work-related applications and data on enrolled user devices, such as by exercising control over enrolled user devices through a management application and management server. In a UEM system, access to certain managed resources can be restricted to computing devices that are enrolled in the UEM system. The UEM system can manage access to managed resources with an access management system, such as an Identity and Access Management ("TAM") system. An access management system can be a system that manages and monitors user access permissions and access rights to files, systems, and services to help protect organizations from data loss and security breaches. In one example, the managed resources can be managed by an access management system that is not part of a UEM system. Accordingly, references made herein to actions performed by a UEM system or management server can be performed by an access management system or access management server.

The request for the managed resource can be received from a user device that is enrolled in the UEM system. For example, a user of the user device can request data or an application from within the management application. The management application can send the request using any available communication protocol, such as an Application Programming Interface ("API") call. Alternatively, the managed resource can be hosted on a web server, and the user device can request the resource by making a Hypertext Transfer Protocol Secure ("HTTPS") call from a web browser. In some examples, the UEM system can implement security measures that restrict access to only internal connections. For example, the management application can establish a Virtual Private Network ("VPN") connection with the management server, and HTTPS requests for managed resources can be routed to an internal web server.

At stage 120, the management server can identify policy attributes associated with the resource. Policy attributes can be attributes used in assessing a user device's posture before granting access to a managed resource. The management server can identify policy attributes by retrieving an access policy associated with the resource. For example, managed resources can have an associated access policy that dictates who is authorized to access the resource and security protocols for accessing the resource. The policy attributes can be included in the access policies. The access policy can be retrieved as a data file, such as a JAVASCRIPT Object Notation ("JSON") file, a text file, or other file type. Access policy data files can be stored in the UEM system at a storage component, such as a database. The management server can query the storage component for the access policy for the corresponding resource, and the database can send the data file of the corresponding access policy.

The policy attributes can be attributes that a requesting user device must have to gain access to the associated resource. Some examples of policy attributes can include possessing a UEM-issued security certificate, having a proper device-level firewall enabled, having a security agent installed, having the security agent running and up-to-date, being in a trusted location when requesting the resource, having a minimum required OS version, not being rooted or jailbroken, having an encrypted disk, having a screen lock with a password, code, or Personal Identification Number ("PIN") set, having recently reported device posture to the management server, having a secure network connection, and so on. A confidence level measures how confident the UEM system is that the data from the user device relating to a policy attribute is reliable. Methods for determining confidence levels are described later herein at stage 140.

The policy attributes for a resource can vary depending on how sensitive the resource is. For example, the access policy for an application that provides access to highly sensitive information for an enterprise can specify different policy attribute requirements than an access policy for a personal email account. Higher sensitivity resources can also require more policy attributes or higher confidence levels than lower sensitivity applications. Policy attributes and confidence levels can be set by an administrator ("admin") using an admin interface. The admin can create security policy groups, and resources assigned to a particular group can have the same policy attribute requirements. For example, managed resources can be grouped into high, medium, and low confidence policies. The admin interface can also allow an admin to set individual security policies for a resource.

At stage 120, the management server can retrieve device data relating to the policy attributes identified in an access policy associated with the managed resource. The device data retrieved can depend on the identified policy attributes. For example, if a UEM-issued security certificate is required, then the management server can request the security certificate from the management application on the requesting user device. The management application can also retrieve information about the security certificate, such as when it was issued. In another example, if having endpoint protection software installed and running is required, then the management application can send data indicating whether such an application is installed and running, the name and version of the application, and when the application was last updated. If the resource can only be accessed from a user device in a trusted location, then the management server can retrieve location data from the management application, such as a Global Positioning System ("GPS") location of the user device. The management server can use other methods for determining the user device's location, such as by cross-referencing the user device's Internet Protocol ("IP") address with a database that contains estimated geolocations based on IP address. If a minimum OS version is required, then the management server can retrieve the user device's OS version.

Some device data can be retrieved asynchronously from the user device. For example, some device data can be obtained before the user device requests the management resource. As an example, the management application on the user device can be configured to periodically send certain types of device data to the management server, and the management server can access this device data without requesting it from the user device in response to a resource access request. Some device data can be created and retained by the UEM system. As an example, the UEM system can keep up-to-date internal records of security certificates issued to enrolled user devices. In such an example, the management server can access the internal security certificate records in lieu of retrieving certificate information from the user device.

The examples of policy attributes described herein, and the data retrieved in relation to the policy attributes, are merely exemplary and not meant to be limiting in any way. For example, a policy attribute can be any attribute associated with a user device or associated user profile. As an example, a policy attribute can be anything directly measured or collected on the user device. A policy attribute can also be anything that can be computed or inferred about the user device, even if the data is not directly measured or collected at the user device.

At stage 130, the management server can calculate a device attribute score for each of the policy attributes. Some device attributes scores can be binary. For example, the management server can assign a zero or one, depending on whether the user device meets the device attribute score criteria. As an example, if endpoint protection software is required, the device attribute score can be a one if the endpoint protection software is present and a zero if it is not. Some device attribute scores can be based on a scale, such as zero to one or zero to 100. For example, if disk encryption is required, the device attribute score can be assigned a value that indicates the percentage of all disks at the user device that have been encrypted, such as 40 when 40% is encrypted and 100 when 100% is encrypted.

Calculating a device attribute score can include adding weighted values to assigned scores. Weights can reflect the importance of policy attributes in relation to each other. For example, if having a firewall enabled is more important than having an up-to-date OS version, then the firewall policy attribute can be assigned a higher weight than the OS version. Weights can be included in the access policy so that they are specific to the managed resource. For example, while having a firewall enabled can be more important than having an up-to-date OS version for one managed resource, the opposite can be true of another resource. The weights of the firewall and OS version policy attributes can be different for the two resources based on their respective importance. In an example, weights can be assigned by an admin using an admin console.

At stage 140, the management server can calculate a confidence score for each device attribute score. The confidence score can be a metric for how confident the system is in a device attribute score. In other words, the confidence score indicates a confidence level in the accuracy and validity of a user device's policy attribute data. Various factors can contribute to a confidence score. One factor can include the age of the attribute data because older data can be out of date and therefore less reliable. The impact of data age can vary by policy attribute. For example, if the attribute data for malware or virus updates is more than a month old, then this may lower the confidence score because malware or virus protection updates are issued more frequently, such as once a week. On the other hand, if the user device has a security certificate issued six months ago, then this can receive a high confidence score because the UEM system issues security certificates once a year.

Some factors can be based on a comparison of the requesting user device and other enrolled user devices in the UEM system. For example, if the application or version of the application reporting the device attribute data is much older than that of other enrolled user devices then this can lower the confidence score of all policy attributes based on data received from the requesting user device. In another example, if the user last updated credentials for accessing the user device over a year ago, but the credentials for other enrolled user devices were updated, on average, in the last three months, then this can decrease a confidence score for the requesting user device. If an attribute measures data over a value or range of values, then the confidence score can be based on how much the user device's value or range of values differs from an average of the values for other enrolled user devices. In another example, if a user requests access to the resource from an unknown location, then this can lower the confidence score. However, if historical data shows that many other enrolled user devices have accessed the network from the same location, then this can raise the confidence score.

One factor can include any indication of malicious code or activity at the user device. Such information can be reported by the management application or a third-party protection agent running on the user device, such as an Endpoint Protection Platform ("EPP"), Endpoint Detection and Response ("EDR"), or Mobile Threat Defense ("MTD") agent. Any indication of malicious code or activity on the user device can lower the confidence score of attribute data received from the user device due to the possibility of tampering with the attribute data or code by malware.

One factor can be based on user behavior patterns at the user device. For example, the management application can collect data on typing patterns of the user, applications typically accessed by the user, authentication failure rates, and other user similar behaviors. Recent user behavior can be compared to more historical user behavior to identify any anomalies or changes in behavior, which can lower the confidence score. As an example, a sudden drop or rise in typing speed, a sudden change in application use, or a sudden change in authentication failure rate can indicate that the user device has been accessed by an unauthorized user.

One factor can be based on the user device's connectivity to the management server. For example, if data travels from the user device to the management server through an unusual network path, or if the network traffic comes from a proxy, then this can indicate that there could be a machine-in-the-middle altering or stealing data. The management server can use one of various tools to trace the network path between the user device and the management server. For example, the management server can run a traceroute or instruct the management application or browser on the user device to generate a HTTP Archive format ("HAR") file. A HAR file is JSON-formatted archive file format for logging a web browser's interaction with a website. Any suspicious or unusual network paths can lower the confidence score of attribute data received from the user device.

Some factors can be based on back-end services. For example, if an event occurs that makes it difficult to assess the user device's posture, such as an outage or data loss at a back-end service that stores or processes user device data, then a confidence score can be lowered.

The management server can calculate one score for each policy attribute, one overall confidence score for all the policy attributes, or a combination of these score types. For example, the management server can calculate a low confidence score for all attributes based on data received from the user device if malicious code is detected at the user device. However, attribute data retrieved from an internal source of the UEM system such as a database, may not receive a low confidence score on account of the malicious code at the user device. If all data from a particular source receives a lower confidence score, then this confidence score can be combined with a confidence score calculated for each individual attribute received from that source. As an example, a first attribute based on user data from the user device can receive a 0.6 confidence score, a second attribute based on user data from the user device can receive a 0.8 confidence score, but due to an issue at the user device, all attribute data received from the user device can have a 0.5 confidence score. In one example, the management server can use the confidence score for all the user device data as a multiplier for the individual confidence scores. For example, the first attribute above can receive a 0.3 (0.6× 0.5=0.3) and the second attribute can receive a 0.4 (0.8× 0.5=0.4). The management server can assign a multiplier to each data source based on the determined reliability of the data received from that source. Each confidence score can be weighted using the multipliers of the data sources whose data was used to calculate the confidence score.

The examples of confidence score factors described above are merely examples and not meant to be limiting in any way. Confidence score factors can be based on any data that can be obtained from enrolled user devices, internal UEM services, or third-party sources. The way confidence scores are calculated can be determined by an admin. For example, admin users can have access to an admin console with an interface that allows the admin to configure how confidence scores are calculated. In one example, the admin can set, for each attribute, what factors are used to calculate a confidence score, how to calculate the confidence score, and so on. For example, the admin can select a specific formula to use when calculating confidence scores and set weights for certain scoring categories. Some confidence scores can be calculated using a scoring algorithm, and the admin can select the policy attributes used as an input for the algorithm. Some algorithms can be machine learning ("ML") algorithms. The admin can use feedback from users to retrain an ML algorithm. For example, if a user is mistakenly denied access to a managed resource, the user can report the denial. The admin can review the data used by the ML algorithm to determine a low confidence score and input feedback to the algorithm so that it can be retrained.

At stage 150, the management server can calculate a device posture score based on the device attribute scores and confidence scores. The device posture score can be an overall device posture score that incorporates all the calculated device attribute and confidence scores. In some examples, the management server can calculate an attribute posture score for individual attributes. An attribute posture score can be a score for an individual device attribute based on the device attribute score and confidence score of that attribute. In some examples, the management server can calculate both an overall device posture score and one or more individual attribute posture scores. For example, one policy can require only a minimum overall device posture score to be granted access to the resource. Another policy can require a minimum attribute posture score for some or each policy attribute. For example, a user can be denied access if the overall device posture score satisfies the access policy, but one of the attribute posture scores does not. Still another policy can require a minimum overall device posture score and a minimum attribute posture score for some or all the policy attributes.

In one example, the confidence scores can be used as a multiplier for device attribute scores. For example, a policy attribute that has an attribute score of 0.9 and a confidence score of 0.3 could have a device posture score of 0.27 (0.9×0.3=0.27). In another example, device posture scores can be calculated by inputting the attribute scores and confidence scores into an algorithm that outputs the device posture score.

At stage 160, the management server can compare the device posture score to an access policy threshold for the managed resource. For example, each policy can have a minimum device posture required for accessing the associated resource, and the management server can compare the device posture score to the threshold. As described previously, a policy can require minimum device posture scores for each policy attribute. In such an example, each attribute can be assigned its own threshold, and the management server can compare the device posture score of a policy attribute to its corresponding threshold.

Figure 3:
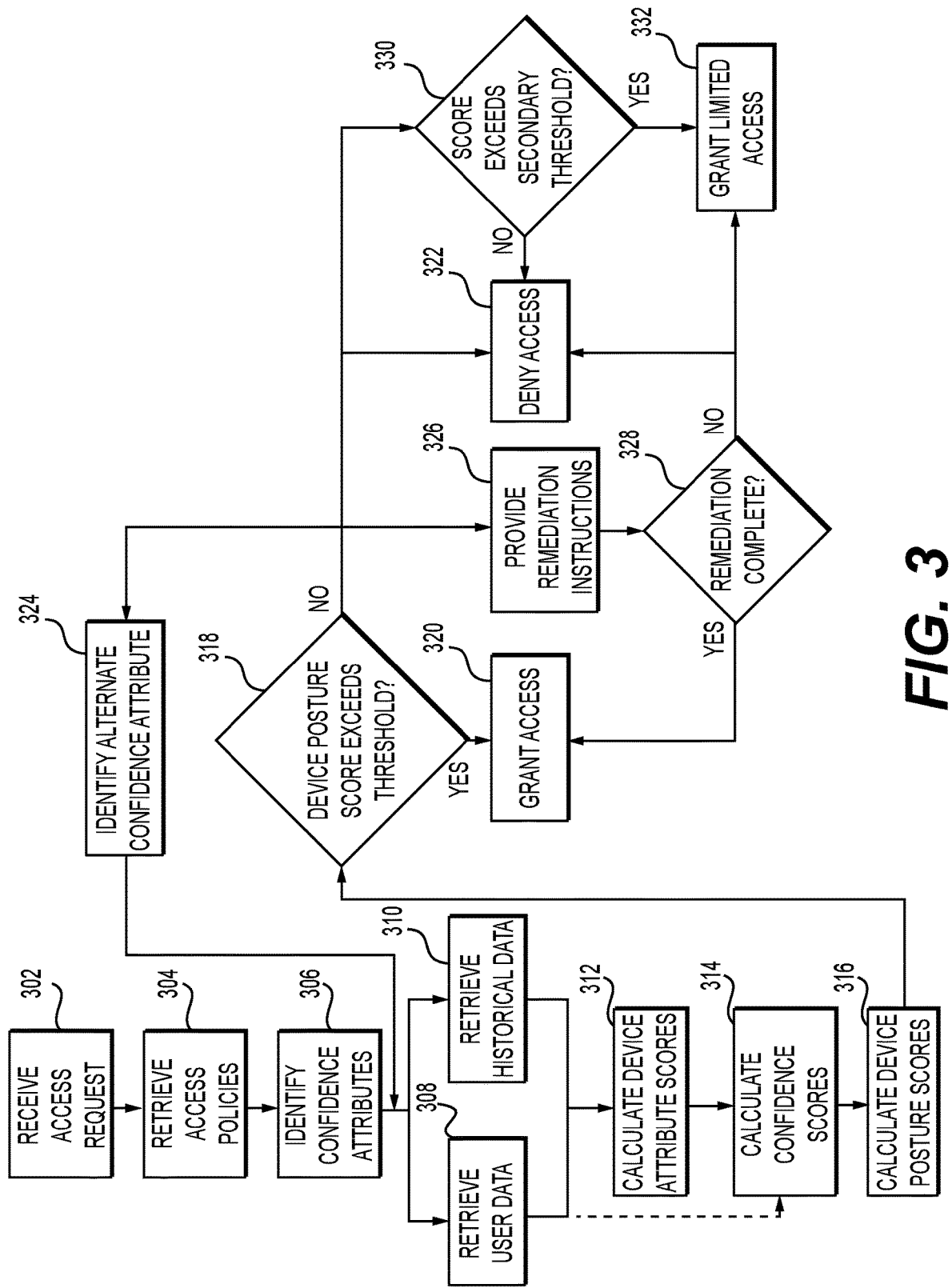
FIG. 3 is another flowchart of an example method for determining confidence in device posture.

At stage 170, the management server can grant access to the request resource if the device posture score exceeds the policy threshold. The management server can do this by performing any action that allows the user device to access the requested resource. For example, if the requested resource is a web or cloud-based application, the management server can forward the request to the corresponding server or cloud provider. The management server can also send credentials verifying that the user device is authorized to access the application. In an example where the user is requesting access to data, the management server can forward the request to the associated database. If the request is for downloading an application, then the management application can forward the request to a corresponding content delivery server, which can send an installation file to the user device. FIG. 3, described later herein, includes example of actions the management server can take if the user device's posture score does not exceed the minimum thresholds set by the policy.

Figure 2:
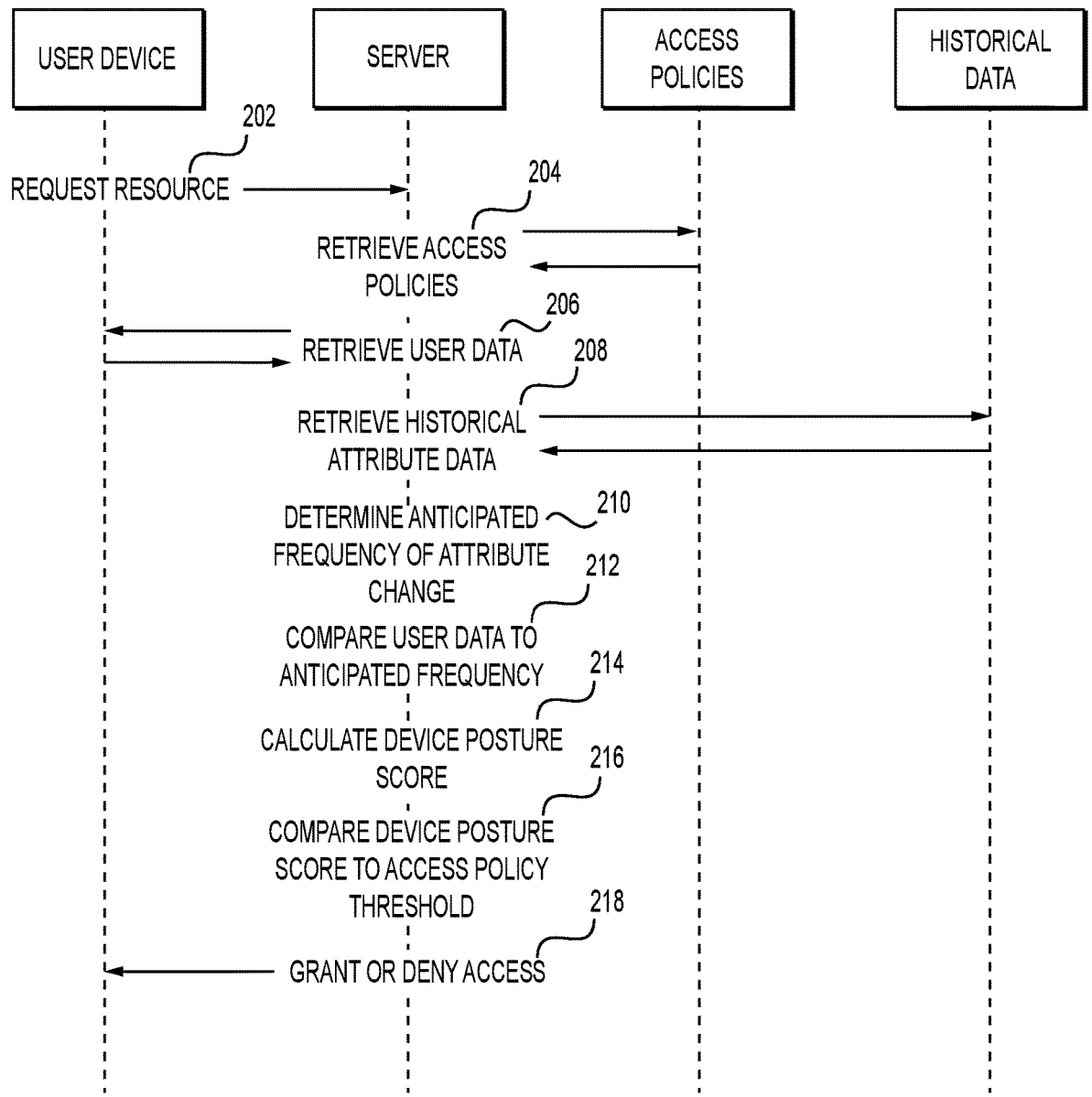
FIG. 2 is a sequence diagram of an example method for determining confidence in device posture.

FIG. 2 is a sequence diagram of an example method for determining confidence in device posture. At stage 202, a user device can request a managed resource from a server. The request for the managed resource can be received from a user device that is enrolled in the UEM system, such that the UEM system can exert control over the user device. For example, a user of the user device can request data, a web site, or an application from within the management application as part of stage 202. The request can also be made from outside the management application, such as from another application installed on the user device or from a web browser. For example, the user device can be configured to send all traffic through a gateway that can process the request and perform the policy and attribute assessment (e.g., a proxy, VPN, etc.). Alternatively, the resource (or hosting server) can be configured to authenticate a session with the user device via an access management system that can perform the policy and attribute assessment prior to allowing access.

At stage 204, the management server can retrieve access policies associated with the requested resource. The access policies can be retained in a storage device or location of the UEM system, such as a database. The management server can query the database for access policies for the requested resource, and the database can respond by sending the corresponding access policies or instructions for retrieving them.

At stage 206, the management server can retrieve device data from the user device. The device data, also referred to in FIG. 2 as user data, can be data from the user device related to policy attributes identified in the access policies. For example, if an access policy calls for the OS version of the requesting user device, then the management server can send a request to the user device for its OS version. In one example, the management application can request the device data from the management application on the user device, and the management application can retrieve the information for the management server.

Although the method describes the management server retrieving device data after receiving a request to access a managed resource, the device data can be obtained at other times. For example, the management application can be configured to send certain device data to the management service periodically or after certain events, such as when the status of an attribute changes. Some device data can be created and retained by the UEM system, such as records of issued security certificates and versions of applications installed on the user device. Any data retained by the UEM system can include a timestamp indicating when the information was last received and/or the device attribute was updated, and the timestamp can be used in assessing confidence in the user device's posture based on the age of the information.

At stage 208, the management server can retrieve historical data relating to the policy attributes. The historical data can be related to the requesting user device and/or other enrolled user devices. For example, some access policies can require a comparison of data from the requesting user device to data from other enrolled user devices to determine a confidence level in the data from the requesting user device. In another example, the management server can retrieve historical data relating to the requesting user device to compare to current data. As an example, if the user device is requesting access to the managed resource from an unknown location, the management server can retrieve records or other location history data indicating whether and how often the requesting user device has accessed the managed resource from the same location.

At stage 210, the management server can determine an anticipated frequency that the policy attribute should change. In an example, the anticipated frequency can be the measured frequency at which the policy attribute changes for other enrolled user devices. The management server can determine the measured frequency by analyzing historical data from other enrolled user devices. For example, depending on the access policy, the management server can calculate the average frequency in which other user devices receive a new security certificate, check in with the management server, update malware or virus protection definitions, update the OS version, update the management application, change access credentials, and so on.

In one example, the anticipated frequency can be based on historical data related to the requesting user device. For example, management server can analyze historical data from the user device to determine, depending on the access policy, how often the user device has historically received a new security certificate, checked in with the management server, updated malware, or virus protection definitions, updated the OS version, updated the management application, changed access credentials, and so on. The management server can calculate an anticipated frequency based on how frequently the policy attribute has historically changed for the user device.

The anticipated frequency can be determined independently of a resource access request. For example, the management server, or another device in the UEM system, can periodically analyze historical data to determine how often a device attribute typically changes on enrolled user device. Alternatively, the anticipated frequency can be calculated in response to a certain event, such as in response to an access policy changing. In such examples, rather than determine the anticipated frequency, the management server can retrieve the most recently calculated anticipated frequency change.

At stage 212, the management server can compare the device data to the anticipated frequency. This can include calculating a difference between the anticipated frequency change and the most recent change of the policy attribute. At stage 214, the management server can calculate a device posture score for the user device. This can include calculating an attribute score for each policy attribute and a confidence score for attribute score. The confidence score for some policy attributes can be based on the comparison of the device data to the anticipated frequency. For example, if the most recent update or change occurred more recently than the anticipated frequency time frame, then the policy attribute can receive the highest confidence score. However, if the length of time since the most recent change or update is longer than the anticipated frequency, then the management server can lower the confidence score for the policy attribute.

As an example, an access policy can require that the user device have a security credential activated for accessing the user device, such as a password or PIN. The management server can determine the average time since devices enrolled in the UEM system have changed their security credential. The management system can compare the average to when the security credential was last changed for the user device. If the security credential was changed more recently than the average, then the security credential policy attribute can receive the highest attribute score. If the security credential was changed less recently than the average, then the security credential attribute can receive a lower confidence score. This can be because older credentials have a higher chance of having been compromised. The confidence score can depend on how much longer it has been since the security credential was updated. For example, if the time since the security credential was updated is seven months and the average is six months, then the confidence score can be lowered slightly. On the other hand, if the time since the security credentials was updated is more than one year, then the confidence score can be lowered more because it is more likely that the security credential has been compromised.

At stage 216, the management server can compare the device posture scores to access policy scoring thresholds. For example, each policy can have a minimum device posture score required for accessing the associated resource, and the management server can compare the device posture score to the threshold. As described previously, a policy can require minimum device posture scores for each policy attribute. In such an example, each attribute can be assigned its own threshold, and the management server can compare the device posture score of a policy attribute to its corresponding threshold.

At stage 218, the management server can grant or deny access to the managed resource based on the comparison. For example, if the device posture score exceeds the threshold, then the management server can grant access. The management server can do this by performing any action that allows the user device to access the requested resource. For example, if the requested resource is a web or cloud-based application, the management server can forward the request to the corresponding server or cloud provider. The management server can also send credentials verifying that the user device is authorized to access the application. In an example where the user is requesting access to data, the management server can forward the request to the associated database. If the request is for downloading an application, then the management application can forward the request to a corresponding content delivery server, which can send an installation file to the user device. FIG. 3, described below, includes example of actions the management server can take if the user device's posture score does not exceed the minimum thresholds set by the policy.

FIG. 3 is another flowchart of an example method for determining confidence in device posture that includes actions that can be taken when a user device's posture score does not exceed a minimum threshold established by an access policy. At stage 302, a server can receive a request for access to a managed resource. The request for the managed resource can be received from a user device that is enrolled in the UEM system. For example, a user of the user device can request data, a web site, or an application from within the management application.

At stage 304, the management server can retrieve access policies associated with the requested resource. The access policies can be retained in a storage device of the UEM system, such as a database. The management server can query the database for access policies for the requested resource, and the database can respond by sending the corresponding access policies.

At stage 306, the management server can identify policy attributes for accessing the requested resource. The policy attributes can be included in the access policy. Some examples of policy attributes can include possessing a UEM-issued security certificate, having a proper device-level firewall enabled, having a security agent installed, having the security agent running and up-to-date, being in a trusted location when requesting the resource, having a minimum required OS version, not being rooted or jailbroken, having an encrypted disk, having a screen lock with a password, code, or Personal Identification Number ("PIN") set, having recently reported device posture to the management server, having a secure network connection, and so on.

At stage 308, the management server can retrieve device data corresponding to the policy attributes. Some device data can be retrieved from the requesting user device. The management server can request information related to the policy attributes from the management application on the requesting user device. Some device data can be retrieved from other servers or databases in the UEM system. For example, the management server can retrieve information about the requesting user's profile or information about the requesting user device previously collected.

Although the method describes the management server retrieving device data after receiving a request to access a managed resource, the device data can be obtained at other times. For example, the management application can be configured to send certain device data to the management service periodically or after certain events, such as when the status of an attribute changes. Some device data can be created and retained by the UEM system, such as records of issued security certificates and versions of applications installed on the user device. Any data retained by the UEM system can include a timestamp indicating when the information was last received and/or the device attribute was updated, and the timestamp can be used in assessing confidence in the user device's posture based on the age of the information.

At stage 310, the management server can retrieve historical data corresponding to the policy attributes. The historical data can be related to the requesting user device and/or other enrolled user devices. For example, some access policies can require a comparison of data from the requesting user device to data from other enrolled user devices to determine a confidence level in the data from the requesting user device. In another example, the management server can retrieve historical data relating to the requesting user device to compare to current data.

At stage 312, the management server can calculate device attribute scores for the policy attributes. Some device attributes scores can be binary. For example, the management server can assign a zero or one, depending on whether the user device meets the device attribute score criteria. As an example, if endpoint protection software is required, the device attribute score can be a one if the endpoint protection software is present and a zero if it is not. Some device attribute scores can be based on a scale, such as zero to one or zero to 100. For example, if disk encryption is required, the device attribute score can be assigned a value that indicates the percentage of all disks at the user device that have been encrypted, such as 40 when 40% is encrypted and 100 when 100% is encrypted.

Calculating a device attribute score can include adding weighted values to assigned scores. Weights can reflect the importance of policy attributes in relation to each other. For example, if having a firewall enabled is more important than having an up-to-date OS version, then the firewall policy attribute can be assigned a higher weight than the OS version. Weights can be included in the access policy so that they are specific to the managed resource. For example, while having a firewall enabled can be more important than having an up-to-date OS version for one managed resource, the opposite can be true of another resource. The weights of the firewall and OS version policy attributes can be different for the two resources based on their respective importance. In an example, weights can be assigned by an admin using an admin console.

At stage 314, the management server can calculate confidence scores for the device attribute scores. The confidence score can be a metric for how confident the system is in a device attribute score. In other words, the confidence score indicates a confidence level in the accuracy and validity of a user device's device attribute data. Various factors can contribute to a confidence score. Some examples of confidence score factors are described previously herein at stage 140 of FIG. 1.

Calculating confidence scores can include comparing the device data and the historical data. Recent user behavior can be compared to more historical user behavior to identify any anomalies or changes in behavior, which can lower the confidence score. As an example, a sudden drop or rise in typing speed, a sudden change in application use, or a sudden change in authentication failure rate can indicate that the user device has been accessed by an unauthorized user. The management server can also compare historical data of other enrolled user devices to the data relating to the requesting user device. For example, the management server can calculate the frequency at which a policy attribute changes in other enrolled user devices and compare the calculated frequency to the most recent change in the policy attribute for the requesting user device. If the frequency for the requesting user devices differs significantly from the calculated frequency of other enrolled user device, then this can lower the confidence score. Also, if the amount of time since the most recent change of the policy attribute for the requesting user device is greater than the calculated frequency for other enrolled user devices, this can lower the confidence score as well.

At stage 316, the management server can calculate a device posture score using the device attribute and confidence scores. The device posture score can be an overall device posture score that incorporates all the calculated device attribute and confidence scores. Alternatively, a device posture score can be calculated for each policy attribute. In some examples, the management server can calculate both overall and individual device posture scores. For example, one policy can require only a minimum overall device posture score to be granted access to the resource. Another policy can require a minimum device posture score for each policy attribute. Still another policy can require a minimum overall device posture score and a minimum device posture for some or all the policy attributes.

At stage 318, the management server can compare the device posture score to a minimum threshold score designated in the access policy for the managed resource. The access policy can designate a minimum threshold for an overall device posture score, for each policy attribute, or some combination of these. The management server can compare each calculated device posture score to its corresponding threshold.

If the device posture scores exceed the access policy scoring thresholds, then the method can proceed to stage 320 where the management server can grant access to the resource. The management server can do this by performing any action that allows the user device to access the requested resource. For example, if the requested resource is a web or cloud-based application, the management server can forward the request to the corresponding server or cloud provider. The management server can also send credentials verifying that the user device is authorized to access the application. In an example where the user is requesting access to data, the management server can forward the request to the associated database. If the request is for downloading an application, then the management application can forward the request to a corresponding content delivery server, which can send an installation file to the user device.

At stage 320, if the device posture scores do not exceed the access policy scoring thresholds, then the method can proceed in one of various ways based on the access policy. In a first example access policy, the method can proceed to stage 322 where the management server can simply deny access to the resource. The management server can cause the user device to display a message notifying the user that access has been denied. The contents of the message can depend on the access policy. For example, one message can inform the user which policy attributes caused the user to be denied. Another message can inform the user only that the user device's posture is insufficient to be granted access. For more sensitive resources, the message can indicate only that access is denied, which can make it more difficult for a malicious entity to understand how to configure their malicious device to better match expected policy attribute values.

In some examples, an access policy can include a denial threshold. A denial threshold can determine when a requesting user device is completely blocked. For example, if a device posture score falls between the access policy threshold and the denial threshold, then in some cases the user can be given remediation instructions for elevating the device posture score and gaining access to the resource. Remediation is described in more detail at stage 326 later herein. However, if a device posture score falls below the denial threshold, then the requesting user device can be denied access altogether with no chance for remediation. In some cases, the requesting user device can be blocked entirely from the UEM system. For example, an identifier, such as an International Mobile Equipment Identity ("IMEI") or Media Access Control ("MAC") address, of the requesting user device can be added to a blocklist or removed from an allow list.

In a second example access policy, the method can proceed to stage 324 where the management server can identify an alternative policy attribute. For example, an access policy can include primary and secondary policy attributes. Secondary policy attributes can be used to overcome a deficiency in a primary device posture attribute. If a secondary policy attribute is included in the access policy, then the method can return to stage 308 for the secondary policy attribute. As an example, a user device can request access to a resource from an unknown location. This can cause a related primary policy attribute to receive a low device posture score that is below the access policy threshold. However, the access policy can designate that, if the access location policy attribute fails, then the corresponding device posture score can be ignored if one or more secondary policy attributes have a high enough device posture score. For example, a secondary device attribute can relate to security settings of the network the user device is connected to. If the network has high enough security settings to receive a device posture score above a corresponding threshold, then this can overcome the access location attribute.

In a third example access policy, the method can proceed to stage 326 where the management server can provide remediation instructions. Remediation instructions can be used to increase the system's confidence in the user and the posture of the user device. Some remediation instructions can include instructing the user to update endpoint protection software, updating OS software, applying a security patch, installing missing endpoint protection software, re-enabling a disabled security feature such as a firewall or proxy configuration, and so on. In some examples, the remediation instructions can include actions for mitigating a low device posture score, such as sending an OTP to another device enrolled with the user's profile, prompting the user to input a biometric credentials like a fingerprint or facial recognition, instructing the user to establish a VPN connection, and so on.

At stage 328, if remediation is completed, the method can proceed to stage 320 where the management server can grant access to the resource. For example, the user can update or install appropriate software, update OS software, apply a security patch, re-enable a disabled security feature, provide an OTP sent by the management server, provide a biometric credential, or establish a VPN connection according to the remediation instructions. If the management server can verify that the remediation instructions were completed, then the management server can grant access to the requested resource.

In a fourth example access policy, the method can proceed from stage 318 to stage 330 where the management server can compare the device posture scores to a secondary access policy threshold. A secondary access policy threshold can be a basis for granting limited access to a resource at stage 332. Limited access can include granting access to some, but not all, of the resource. It can also include restricting actions the user can perform. For example, the user can be granted read-only access to an application, granted access to only portions of an application, or granted access to a portion of requested data. If the device posture score does not exceed the secondary threshold, then the method can proceed to stage 322 where the management server can deny access to the resource.

The user device can also be granted limited access to the resource when remediation is not complete at stage 328. For example, a user can be granted limited access to the resource until remediation is complete. After completing the remediation, the management server can grant full access.

Figure 4:
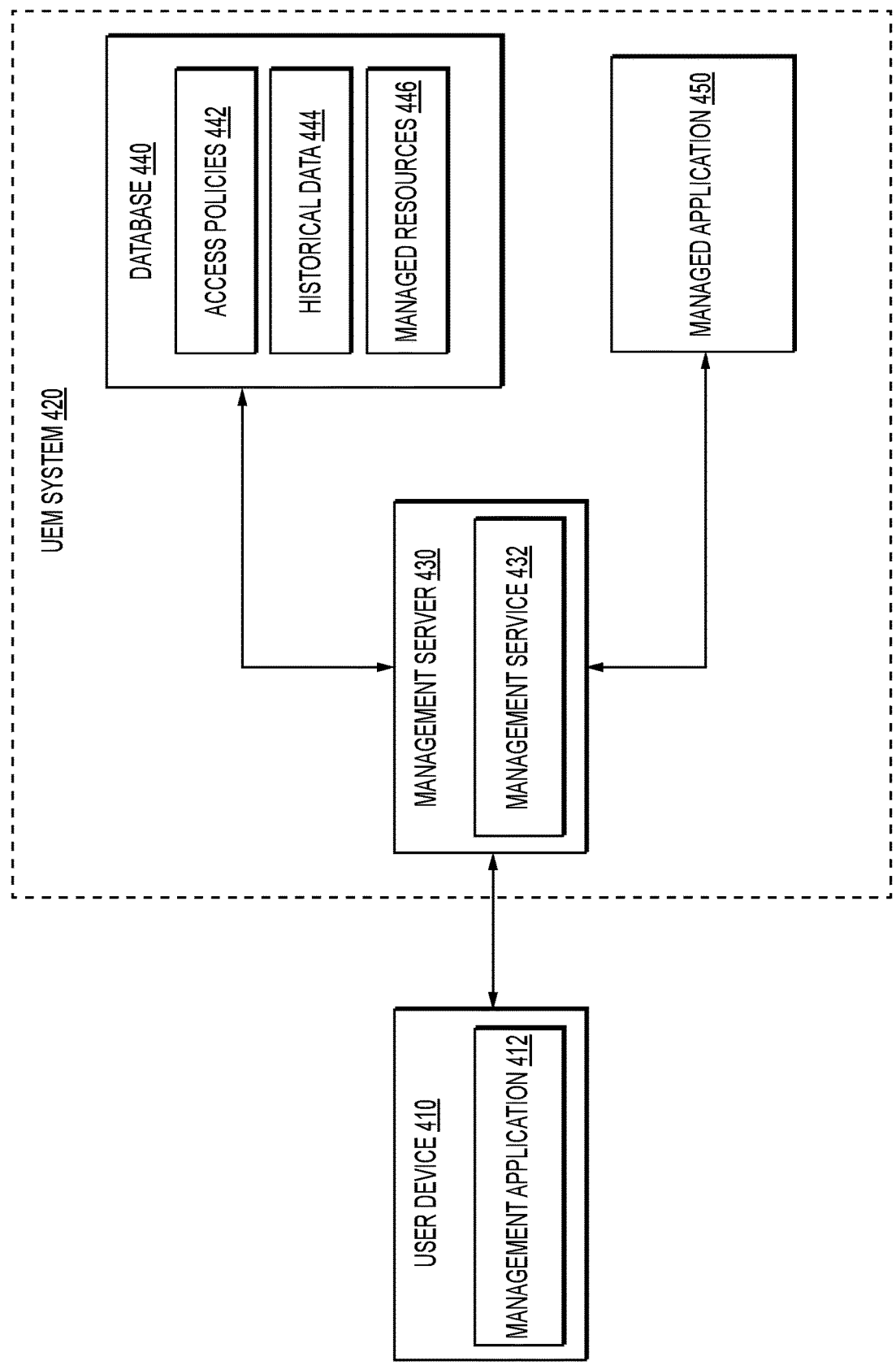
FIG. 4 is an illustration of an example system for performing determining confidence in device posture.

FIG. 4 is an illustration of an example system for determining confidence in device posture. The system can include a user device 410 that is enrolled in a UEM system 420. The user device 410 can be one or more processor-based devices, such as a personal computer, tablet, or cell phone. The UEM system 420 can be any system that allows enterprises to manage work-related applications and data on enrolled user devices, such as by exercising control over enrolled user devices through a management application 412 and a management service 432 on a management server 430. In some examples, the UEM system 420 can be an access management system, which is a system that manages and monitors user access permissions and access rights to files, systems, and services to help protect organizations from data loss and security breaches. As an example, the UEM system 420 can be an IAM system.

The management server 430 can be a single server or a group of servers, including multiple servers implemented virtually across multiple computing platforms. The management server 430 can manage enrolled user devices with the management service 432. The management service 432 can manage enrolled user devices, such as the user device 410, by sending management instructions to the management application 412 installed on the user devices. The management application 412 can be a stand-alone application, part of an enterprise application, or part of an operating system of the user device 410.

The management application 412 can be responsible for ensuring that the user device 410 is up to date with compliance and security settings prior to accessing enterprise data and resources. The management application 412 can communicate with the management server 430, allowing UEM management of the user device 410 based on compliance and security settings at the management server 430. The management application 412 can enforce compliance at the user device 410, such as by locking the user device 410, notifying an admin, or wiping enterprise data when compliance standards are not met. Example compliance standards can include ensuring a device is not jailbroken, that particular encryption standards are used in enterprise data transmission, that the device does not have certain block listed applications installed or running, and that the device is located within a geofenced area when accessing certain managed resources 446.

In one example, the user device 410 can access managed resources 446 through the management server 430. The management application 412 can facilitate requests for managed resources 446 at the user device end. For example, the management application 412 can send requests for managed resources 446 and manage such resources at the user device 410 when received. The management application 412 can communicate with the management server 430 using any available communication protocol, such as an API.

The management server 430 can be responsible for assessing the posture of user devices requesting access to a managed resource 446. Access policies 442 for managed resources 446 can be stored within the UEM system 420, such as in a database 440. The database 440 can be any network storage component, such as a database server. The database 440 can also store historical data 444, which can include data from enrolled user devices that can be used to assess the device posture of user devices requesting access to managed resources 446. Some of the historical data 444 can be collected by the management application 412 and sent to the UEM system 420. The access policies 442 and historical data 444 can be stored on the same or different databases 440.

One example managed resource 446 is a managed application 450. The managed application 450 can be an application that allows the UEM system 420 to control its access and functionality. Portions of the managed application 450 can persist locally on the user device 410 or can be accessed from within the management application 412, depending on the example. The managed application 450 can also be accessed remotely through a web browser installed on the user device 410.

Requests for access to the managed application 450 and other managed resources 446, such as enterprise data and services, can be routed to the management server 430. The management server 430 can assess the device posture of the requesting user device 410 before granting access to the requested resource 446. For example, if the user device 410 requests access to the managed application 450, the request can be routed to the management server 430. The management server 430 can retrieve the access policy 442 for the managed application 450 and identify policy attributes in the access policy 442. The management server 430 can instruct the management application 412 to send data related to the policy attributes. The management server 430 can also retrieve relevant historical data 444 as well. The management server 430 can calculate device attribute scores for each policy attribute. The management server 430 can also assess the confidence in the device attribute scores and calculate a corresponding confidence score. Using the device attribute scores and confidence scores, the management server 430 can calculate a device posture score for the user device 410. The management server 430 can grant or deny access to the managed application 450 based on the device posture score.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for determining confidence in device posture, comprising:
   receiving a resource access request for a managed resource;
   retrieving an access policy associated with the managed resource;
   retrieving device data corresponding to a first policy attribute identified in the access policy;
   determining, based on the device data, a first device attribute score corresponding to the first policy attribute,
   determining a first confidence score corresponding to the first policy attribute;
   determining, using the first device attribute score and the first confidence score, a first device posture score;
   comparing the first device posture score to a first threshold from the access policy; and
   in an instance where the first device posture score exceeds the first threshold, granting access to the managed resource.

2. The method of claim 1, further comprising:
   in an instance where the first confidence score does not exceed the first threshold, identifying, based on the access policy, a second policy attribute;
   determining a second device posture score associated with the second policy attribute;
   comparing the second device posture score to a second threshold from the access policy; and
   in an instance where the first confidence score exceeds the second threshold, granting access to the managed resource.

3. The method of claim 1, further comprising:
   in an instance where the first confidence score does not exceed the first threshold, providing, to a user device that provided the request for the managed resource, remediation instructions for accessing the managed resource;
   receiving data indicating that the remediation instructions were completed successfully; and
   granting access to the managed resource.

4. The method of claim 1, further comprising:
   in an instance where the first confidence score does not exceed the first threshold, determining that the first device posture score exceeds a second threshold from the access policy; and
   based on the first device posture score exceeding the second threshold and not exceeding the first threshold, granting limited access to the managed resource.

5. The method of claim 1, wherein calculating the first confidence score corresponding to the first policy attribute comprises:
   determining, using historical data associated with the first policy attribute, an anticipated frequency of change to the first policy attribute;
   determining, using the device data, a measured frequency of change of the policy attribute; and
   comparing the anticipated frequency of change to the first policy attribute and the measured frequency of change to the first policy attribute.

6. The method of claim 1, wherein the first confidence score is based on an age of the device data.

7. The method of claim 1, further comprising:
   calculating, based on the device data, a second device attribute score corresponding to a second policy attribute identified in the access policy; and
   calculating a second confidence score corresponding to the second policy attribute, wherein the first device posture score is calculated also using the second device attribute score and the second confidence score.

8. A non-transitory, computer-readable medium containing instructions that, when executed by a hardware-based processor, causes the processor to perform stages for determining confidence in device posture, the stages comprising:
   receiving a resource access request for a managed resource;
   retrieving an access policy associated with the managed resource;
   retrieving device data corresponding to a first policy attribute identified in the access policy;
   determining, based on the device data, a first device attribute score corresponding to the first policy attribute,
   determining a first confidence score corresponding to the first policy attribute;
   determining, using the first device attribute score and the first confidence score, a first device posture score;
   comparing the first device posture score to a first threshold from the access policy; and
   in an instance where the first device posture score exceeds the first threshold, granting access to the managed resource.

9. The non-transitory, computer-readable medium of claim 8, the stages further comprising:

in an instance where the first confidence score does not exceed the first threshold, identifying, based on the access policy, a second policy attribute;
determining a second device posture score associated with the second policy attribute;
comparing the second device posture score to a second threshold from the access policy; and
in an instance where the first confidence score exceeds the second threshold, granting access to the managed resource.

10. The non-transitory, computer-readable medium of claim 8, the stages further comprising:
in an instance where the first confidence score does not exceed the first threshold, providing, to a user device that provided the request for the managed resource, remediation instructions for accessing the managed resource;
receiving data indicating that the remediation instructions were completed successfully; and
granting access to the managed resource.

11. The non-transitory, computer-readable medium of claim 8, the stages further comprising:
in an instance where the first confidence score does not exceed the first threshold, determining that the first device posture score exceeds a second threshold from the access policy; and
based on the first device posture score exceeding the second threshold and not exceeding the first threshold, granting limited access to the managed resource.

12. The non-transitory, computer-readable medium of claim 8, wherein calculating the first confidence score corresponding to the first policy attribute comprises:
determining, using historical data associated with the first policy attribute, an anticipated frequency of change to the first policy attribute;
determining, using the device data, a measured frequency of change of the policy attribute; and
comparing the anticipated frequency of change to the first policy attribute and the measured frequency of change to the first policy attribute.

13. The non-transitory, computer-readable medium of claim 8, wherein the first confidence score is based on an age of the device data.

14. The non-transitory, computer-readable medium of claim 8, the stages further comprising:
calculating, based on the device data, a second device attribute score corresponding to a second policy attribute identified in the access policy; and
calculating a second confidence score corresponding to the second policy attribute, wherein the first device posture score is calculated also using the second device attribute score and the second confidence score.

15. A system for determining confidence in device posture, comprising:
a memory storage including a non-transitory, computer-readable medium comprising instructions; and
a hardware-based processor that executes the instructions to carry out stages comprising:
receiving a resource access request for a managed resource;
retrieving an access policy associated with the managed resource;
retrieving device data corresponding to a first policy attribute identified in the access policy;
determining, based on the device data, a first device attribute score corresponding to the first policy attribute,
determining a first confidence score corresponding to the first policy attribute;
determining, using the first device attribute score and the first confidence score, a first device posture score;
comparing the first device posture score to a first threshold from the access policy; and
in an instance where the first device posture score exceeds the first threshold, granting access to the managed resource.

16. The system of claim 15, the stages further comprising:
in an instance where the first confidence score does not exceed the first threshold, identifying, based on the access policy, a second policy attribute;
determining a second device posture score associated with the second policy attribute;
comparing the second device posture score to a second threshold from the access policy; and
in an instance where the first confidence score exceeds the second threshold, granting access to the managed resource.

17. The system of claim 15, the stages further comprising:
in an instance where the first confidence score does not exceed the first threshold, providing, to a user device that provided the request for the managed resource, remediation instructions for accessing the managed resource;
receiving data indicating that the remediation instructions were completed successfully; and
granting access to the managed resource.

18. The system of claim 15, the stages further comprising:
in an instance where the first confidence score does not exceed the first threshold, determining that the first device posture score exceeds a second threshold from the access policy; and
based on the first device posture score exceeding the second threshold and not exceeding the first threshold, granting limited access to the managed resource.

19. The system of claim 15, wherein calculating the first confidence score corresponding to the first policy attribute comprises:
determining, using historical data associated with the first policy attribute, an anticipated frequency of change to the first policy attribute;
determining, using the device data, a measured frequency of change of the policy attribute; and
comparing the anticipated frequency of change to the first policy attribute and the measured frequency of change to the first policy attribute.

20. The system of claim 15, wherein the first confidence score is based on an age of the device data.

* * * * *